United States Patent
Xiong et al.

(10) Patent No.: US 9,875,842 B2
(45) Date of Patent: Jan. 23, 2018

(54) INDUCTOR AND CONVERTER HAVING THE SAME

(71) Applicant: Delta Electronics (Shanghai) CO., LTD, Shanghai (CN)

(72) Inventors: Yahong Xiong, Shanghai (CN); Yunyun Gao, Shanghai (CN); Xiangxing Zheng, Shanghai (CN); Shaohua Zhu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 121 days.

(21) Appl. No.: 14/688,669

(22) Filed: Apr. 16, 2015

(65) Prior Publication Data

US 2015/0332844 A1    Nov. 19, 2015

(30) Foreign Application Priority Data

May 13, 2014 (CN) .......................... 2014 1 0201425
Jul. 1, 2014 (CN) .......................... 2014 1 0310324

(51) Int. Cl.
  *H01F 27/28* (2006.01)
  *H02M 3/158* (2006.01)
  (Continued)

(52) U.S. Cl.
  CPC ......... *H01F 27/2852* (2013.01); *H01F 17/06* (2013.01); *H01F 27/2804* (2013.01);
  (Continued)

(58) Field of Classification Search
  CPC .......................................... H01F 27/00–27/30
  (Continued)

(56) References Cited

U.S. PATENT DOCUMENTS 3,992,690 A    11/1976 Sperr, Jr.
5,287,083 A    2/1994 Person et al.
(Continued)

FOREIGN PATENT DOCUMENTS

CN    102640233 A    8/2012
CN    102709023 A    10/2012
(Continued)

OTHER PUBLICATIONS

1st OA dated Nov. 9, 2016 by the CN Office.
2nd OA dated Jul. 21, 2017 by CN Office.

*Primary Examiner* — Tuyen Nguyen
(74) *Attorney, Agent, or Firm* — Yunling Ren

(57) ABSTRACT

The present disclosure discloses an inductor and a converter having the same. The inductor includes a magnetic core and a winding, the winding is provided within a window of the magnetic core, the winding includes a main body part and a sampling part, the main body part and the sampling part are connected in series, and a length ratio of the sampling part to the main body part is less than 2; wherein the main body part is formed of a low resistivity conductive material, the sampling part is formed of a low temperature coefficient conductive material, and a current flowing through the inductor is sampled across two ends of the sampling part. The inductor can obtain a current detection signal with high accuracy and low temperature drift with a compact structure, without increasing detection loss.

9 Claims, 14 Drawing Sheets

(51) Int. Cl.
   *H02H 7/12*     (2006.01)
   *H01F 27/29*    (2006.01)
   *H01F 17/06*    (2006.01)
   *H01F 27/40*    (2006.01)

(52) U.S. Cl.
   CPC ........... *H01F 27/29* (2013.01); *H01F 27/402* (2013.01); *H02H 7/1213* (2013.01); *H02M 3/158* (2013.01)

(58) Field of Classification Search
   USPC .......................... 336/65, 107, 192, 200, 232
   See application file for complete search history.

(56) References Cited

U.S. PATENT DOCUMENTS

| | | | |
|---|---|---|---|
| 6,930,582 B2* | 8/2005 | Ball | H01F 27/29 336/192 |
| 7,411,477 B2* | 8/2008 | Watanabe | H01F 27/027 336/192 |
| 7,492,246 B2* | 2/2009 | Chang | H01F 27/29 336/192 |
| 8,018,310 B2* | 9/2011 | Hansen | H01F 17/04 336/192 |
| 2008/0074225 A1* | 3/2008 | Hansen | H01F 17/04 336/83 |
| 2014/0292458 A1* | 10/2014 | Andres | H01F 27/402 336/105 |
| 2014/0292459 A1* | 10/2014 | Andres | H01F 27/402 336/105 |

FOREIGN PATENT DOCUMENTS

| | | |
|---|---|---|
| CN | 103063891 A | 4/2013 |
| CN | 103559968 A | 2/2014 |

* cited by examiner

INDUCTOR AND CONVERTER HAVING THE SAME

CROSS REFERENCE TO RELATED APPLICATIONS

The present application claims priority under 35 U.S.C. §119 to Chinese Patent Applications No. 201410201425.9, filed on May 13, 2014, and Chinese Patent Applications No. 201410310324.5, filed on Jul. 1, 2014, the entire contents of which are incorporated herein by reference.

TECHNICAL FIELD

The present disclosure relates to an inductor and a converter, and more particularly, to an inductor integrated with a thermal-stable sampling part and a converter having the inductor.

BACKGROUND

In a converter system, current detection is very important for realizing current mode control, current sharing, current monitoring, current overload limiting and current overload protection. The existing current detection method performs detecting/sampling to an output current by using a current detection resistor with high accuracy, by using a direct current (DC) resistance of an output conductor, or by using an on-resistance of switch, etc.

FIG. 1 is an existing current detection circuit using the current detection resistor with high accuracy. As shown in FIG. 1, the current detection resistor includes a sampling resistance Rsense and a differential amplifier OPA. An output inductor Lo has an inductance L and an equivalent series resistance DCR. The output inductor Lo is connected to the sampling resistance Rsense in series. Input terminals of the differential amplifier OPA are connected to the sampling resistance Rsense in parallel for amplifying a voltage signal across the sampling resistance Rsense so as to obtain a current detection signal. The magnitude of the current signal flowing through the sampling resistance Rsense may be known by measuring voltages across the sampling resistance Rsense and via I=V/R. It should be noted, the sampling resistance Rsense is a current detection resistor with high accuracy.

The method for detecting current by using a current detection resistor with high accuracy has the advantage of high current detection accuracy and low temperature drift. Since a resistance with a low temperature coefficient may be adopted, the influence by the temperature drift can be avoided. However, this method has the following deficiency: when the current flowing through the current detection resistor is relatively large, a relatively large loss may be occurred in the current detection resistor, thereby heat dissipation issues need to be considered during the design of circuit. In addition, the current detection resistor with high accuracy occupies a relatively large space.

FIG. 2 is an existing current detection circuit using the on-resistance of switch, which can efficiently save space and have a relatively low conduction loss. However, this solution has relatively low current detection accuracy and relatively large temperature drift.

FIG. 3 is an existing current detection circuit using a parasitic resistance of the output inductor. As shown in FIG. 3, the current detection circuit includes an output inductor Lo, a resistance R, a capacitance C and a differential amplifier OPA, wherein the output inductor Lo includes an inductance L and an equivalent series resistance DCR. The resistance R and the capacitance C constitute a RC filtering circuit for filtering sampling signals of the output inductor Lo.

When $L/R_{DCR}=RC$ is satisfied, a voltage on the capacitance is in proportion to a current $i_L$ flowing through the inductance L. Thereby, the magnitude of the load current and inductive current may be detected only by detecting the magnitude of the voltage on the capacitance. Such method is convenient and simple, can save space efficiently, and has a relatively low conduction loss, but has relatively low current detection accuracy and relatively large temperature drift.

Therefore, a new current detection solution is needed.

The information described above is only used to enhance the understanding of the background of the present disclosure, and thus may include the information which is not regarded as the ordinary skill in the art for the person skilled in the art.

SUMMARY

One object of the present disclosure is to provide a novel inductor for current detection. The inductor can generate a current detection signal with high accuracy and low temperature drift, occupy small space, and has a low conduction loss. Another object of the present disclosure is to provide a converter adopting the above-mentioned novel inductor.

Other objects, features and benefits of the present disclosure may become apparent by the following detailed description, or partially understood by practicing the present disclosure.

According to a first aspect of the present disclosure, there is provided an inductor having a current sampling function, including: a magnetic core including at least one window; and at least one winding provided within the at least one window, wherein the at least one winding includes a main body part and a sampling part, the main body part has a first end and a second end, the sampling part has a first end and a second end, the first end of the sampling part is connected to the second end of the main body part such that the main body part and the sampling part are connected in series, and a length ratio of the sampling part to the main body part is less than 2; wherein the main body part is formed of a low resistivity conductive material, the sampling part is formed of a low temperature coefficient conductive material, and a current flowing through the inductor is sampled across two ends of the sampling part.

According to a second aspect of the present disclosure, there is provided a converter, including the inductor mentioned above, the converter being configured to obtain a current detection signal of the converter by the sampling part of the inductor.

According to another aspect of the present disclosure, there is provided an inductor, including: a winding including a main body part and a sampling part which are connected in series, a length ratio of the sampling part to the main body part is less than 2; and a first and second sampling terminals for detecting voltages across two ends of the sampling part, wherein the main body part is formed of a low resistivity conductive material, and the sampling part is formed of a low temperature coefficient conductive material.

According to a third aspect of the present disclosure, there is provided a converter, including the inductor mentioned above, the converter being configured to obtain a current detection signal of the converter by the first and second sampling terminals of the inductor.

According to the technical solutions in the present disclosure, the inductor may obtain the current detection signal with high accuracy and low temperature drift with a compact structure, without increasing detection loss.

BRIEF DESCRIPTION OF THE DRAWINGS

The above and other features and advantages of the present disclosure will become more apparent by describing the embodiments thereof in detail with reference to the drawings.

DETAILED DESCRIPTION

Figure 1:
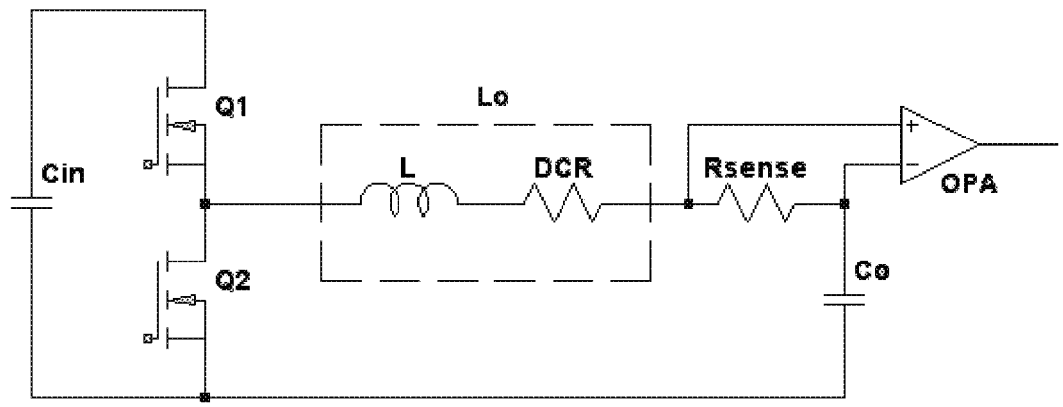
FIG. 1 is a schematic diagram of a current detection circuit using a current detection resistor with high accuracy in related art.
Figure 2:
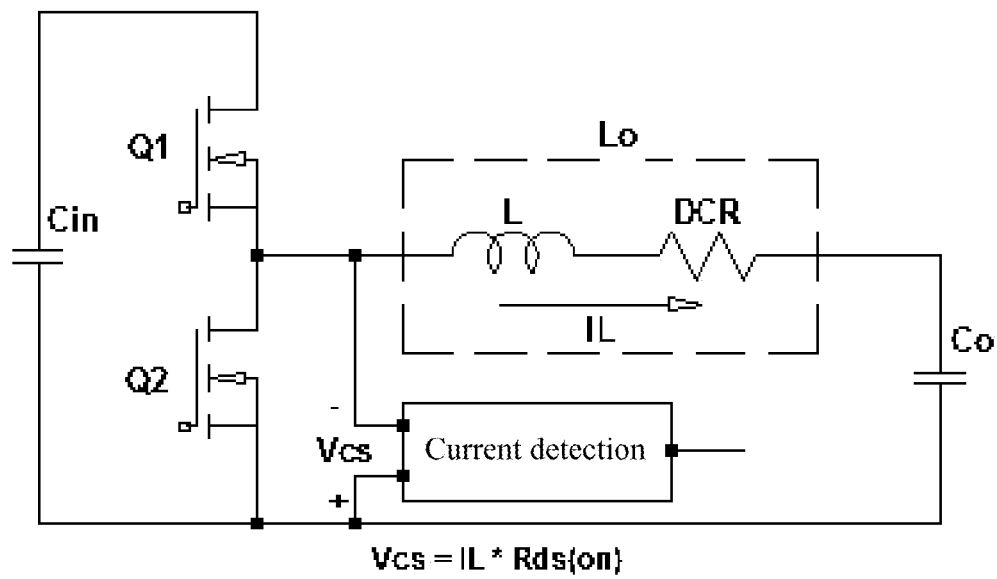
FIG. 2 is a schematic diagram of a current detection circuit using an on-resistance of a switch in related art.
Figure 3:
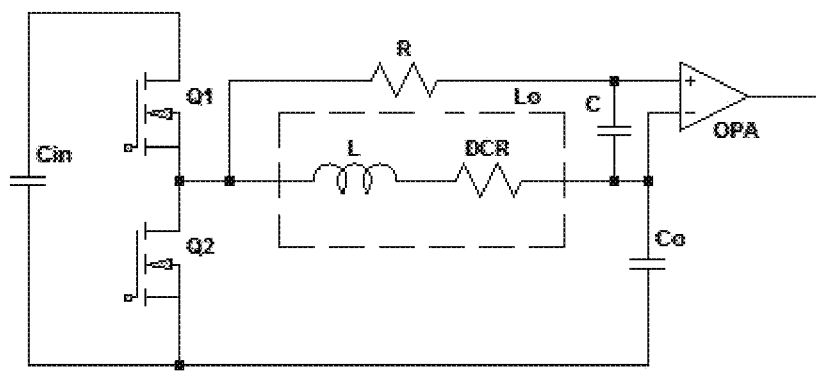
FIG. 3 is a schematic diagram of a current detection circuit using a parasitic resistance of an output inductor in related art.

Now the embodiments will be described more completely with reference to the drawings. However, the embodiments can be implemented in various forms, and shall not be interpreted to be limited to the embodiments explained herein. On the contrary, these embodiments are provided for making the present disclosure to be complete and intact, and for delivering the concept of the embodiments to the person skilled in the art completely. In the drawings, for clarity, thicknesses of areas and layers are exaggerated. In the drawings, the same reference signs indicate the same or similar parts, and thus the repeated depiction of them could be omitted.

In addition, the described features, structures or characters may be combined in one or more embodiments in any appropriate manner. In the following depiction, many specific details are provided for sufficient understanding of the embodiments of the present disclosure. However, the person skilled in the art could appreciate that the technical solutions of the present disclosure could be practiced without one or more elements in the specific details, or by adopting other methods, components, materials and the like. In other conditions, the known structures, materials or operations are not illustrated or described in detail for avoiding blurring respective aspects of the present disclosure.

The typical embodiments embodying the features and advantages of the present disclosure will be described in detail in the following description. It should be appreciate that the present disclosure may have various changes to different embodiments, all of which do not depart from the scope of the present disclosure, and the description and drawings are used for explanation in essence, but not for limiting the present disclosure.

Figure 4:
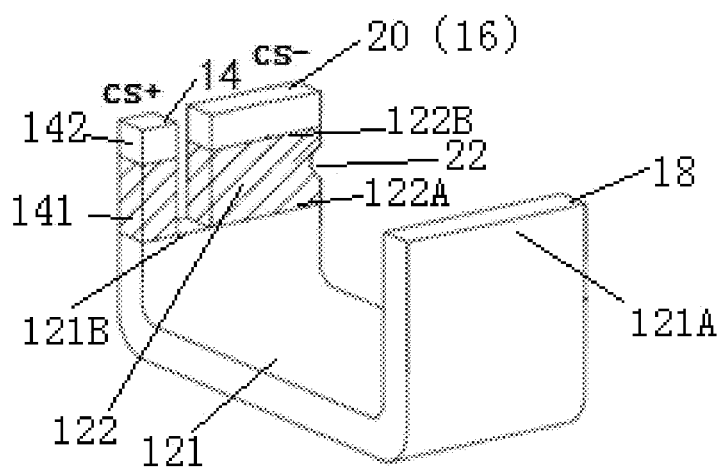
FIG. 4 is a schematic diagram of an inductor winding according to one embodiment of the present disclosure.
Figure 5:
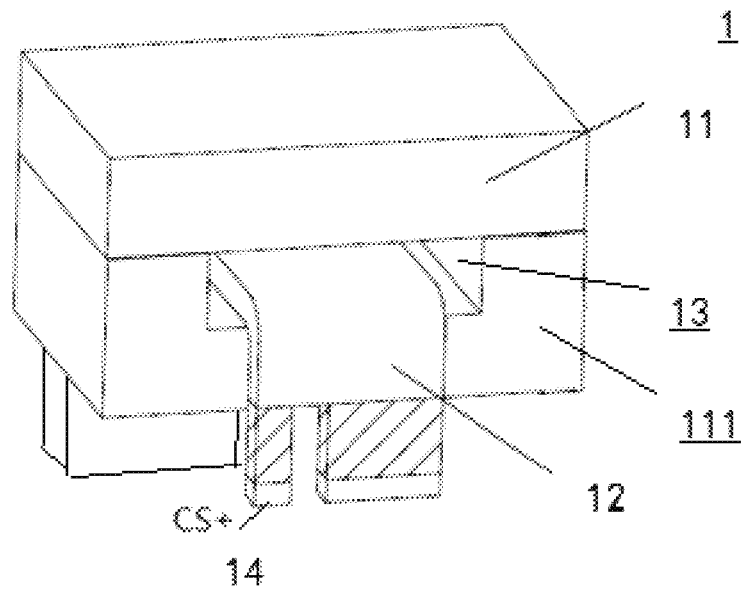
FIG. 5 is a schematic diagram of an inductor according to one embodiment of the present disclosure, and the inductor includes a magnetic core and a winding shown in FIG. 4.
Figure 6:
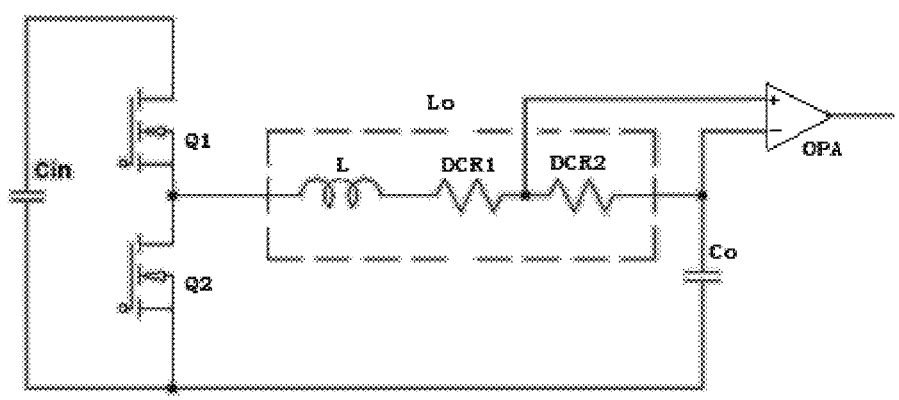
FIG. 6 is a schematic diagram of a current detection circuit having the inductor shown in FIG. 5 according to one embodiment of the present disclosure.

FIG. 4 is a schematic diagram of an inductor winding according to one embodiment of the present disclosure. FIG. 5 is a schematic diagram of an inductor according to one embodiment of the present disclosure, and the inductor includes a magnetic core and a winding shown in FIG. 4. FIG. 6 is a principle scheme of a current detection circuit having the inductor shown in FIG. 5 according to one embodiment of the present disclosure.

As shown in FIGS. 4 and 5, the inductor 1 according to the embodiment of the present disclosure includes a magnetic core 11 and a winding 12. However, the present disclosure is not limited thereto.

The magnetic core 11 has a first surface 111, a second surface (not shown) opposite to the first surface 111, and a window 13, and the window 13 runs through the magnetic core 11. The winding 12 is provided in the window 13.

As shown in FIG. 4, the winding 12 may include a main body part 121 and a sampling part 122 which are connected in series. For example, the main body part 121 has a first end 121A and a second end 121B, the sampling part 122 has a first end 122A and a second end 122B, and the first end 122A of the sampling part 122 is connected with the second end 121B of the main body part 121.

The main body part 121 is formed of a low resistivity conductive material. The sampling part 122 is formed of a low temperature coefficient conductive material. The length ratio of the sampling part 122 to the main body part 121 is less than 2. According to another embodiment, the length ratio is less than 1.

In the present disclosure, the low temperature coefficient conductive material may be a conductive material having a temperature coefficient of less than 500 ppm, and the low resistivity conductive material may be a conductive material having a resistivity of lower than 0.1 Ω·mm²/m. In an embodiment, the low temperature coefficient conductive material may be a conductive material having a temperature coefficient of less than 300 ppm.

The temperature drift performance of the low temperature coefficient conductive material is superior to the low resistivity conductive material, while the resistivity of the low temperature coefficient conductive material is much larger than that of the low resistivity conductive material. According to the present disclosure, only part of the winding is replaced by the low temperature coefficient conductive material, and the low temperature coefficient conductive material should be as short as possible for reducing the winding loss. The length of the low temperature coefficient conductive material is just maintained to ensure the winding to process and sense the current detection signal. The low temperature coefficient conductive material and the low resistivity conductive material may be welded together via laser welding.

According to an embodiment, the low temperature coefficient conductive material may be MnCu alloy or MnCuSn alloy, while the low resistivity conductive material may be copper. Compared with the copper, such alloy has the features of low temperature drift coefficient and high resistivity. It can be seen from Table 1 below, even for the best material MnCuSn, although the temperature coefficient thereof is 10 ppm, the resistivity is about 16 times of pure copper. If the entire winding is replaced by the low temperature coefficient alloy, the DC resistance of the winding will increase at least 16 times, which is unacceptable.

TABLE 1

| Material | Resistivity ($\Omega \cdot mm^2/m$) | Temperature Coefficient |
| --- | --- | --- |
| Pure Copper | 0.01751 | 0.00393 |
| BMn40-1.5 (constantan) | 0.48 | 0.00002 |
| BMn3-12 (manganin) | 0.435 | 0.00003 |
| MnCuSn | 0.29 | 0.00001 |

In addition to a first inductive terminal 18 and a second inductive terminal 20, the inductor 1 or winding 12 may also have a first sampling terminal (CS+) 14 and a second sampling terminal (CS−) 16 for detecting a voltage across the two ends of the sampling part. As shown in FIG. 4, the first end 121A of the main body part 121 functions as the first inductive terminal 18, and the second inductive terminal 20 is connected to the second end 122B of the sampling part. The first sampling terminal 14 is connected to the second end 121B of the main body part 121, and the second sampling terminal 16 is connected to the second end 122B of the sampling part 122. In this embodiment, the second sampling terminal 16 and the second inductive terminal 20 are common terminal, but the present disclosure is not limited thereto. For example, the second sampling terminal 16 and the second inductive terminal 20 may also be terminals separated from each other, as shown in FIGS. 8A-8D. The sampling terminal and the inductive terminal being separated may reduce an influence of a power current flowing through the inductor on the sampling current, thereby further improve the accuracy of the current sampling. Moreover, the present disclosure may not include the second sampling terminal, as the embodiment shown in FIGS. 7A-7B, a current flowing through the inductor may be sampled directly by the first sampling terminal 14 and the second end 122B of the sampling part 122, meanwhile, the first end 121A of the main body part 121 may function as the first inductive terminal of the inductor, and the second end 122B of the sampling part 122 may function as the second inductive terminal of the inductor.

Figure 7A:
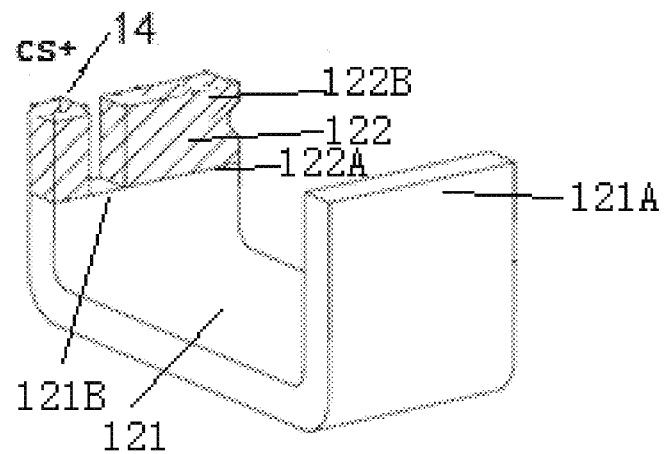
FIGS. 7A, 7B and 7C are schematic diagrams of inductor windings according to another embodiment of the present disclosure.
Figure 7B:
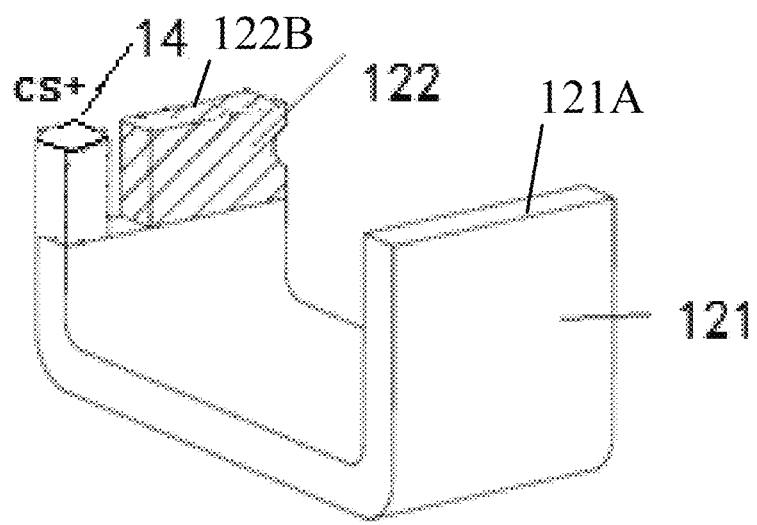
Figure 7C:
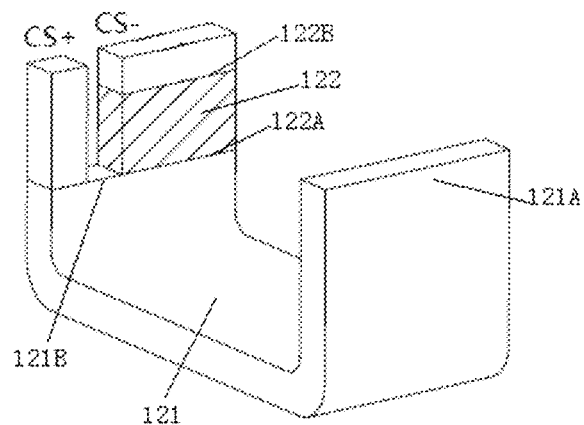
Figure 8A:
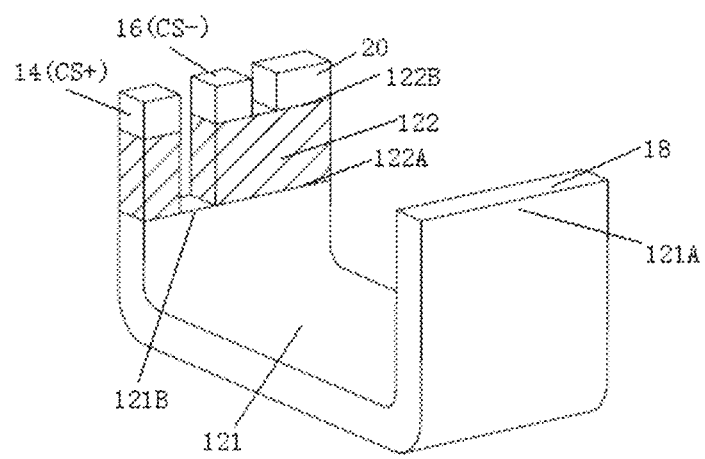
FIGS. 8A, 8B, 8C and 8D are schematic diagrams of inductor windings according to another embodiment of the present disclosure.
Figure 8B:
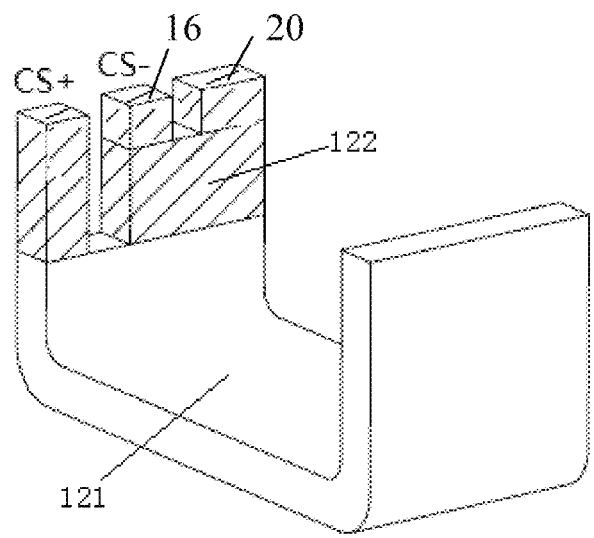

As shown in FIG. 4, the first sampling terminal 14 may include: a first part 141 which is connected to the main body part 121 and is formed of the same low temperature coefficient conductive material as the sampling part 122; and a second part 142 which is located at an end of the first part 141 and is formed of a low resistivity conductive material, but the present disclosure is not limited thereto. For example, the first sampling terminal may be formed of, for instance, the same low temperature coefficient conductive material as the sampling part 122, as shown in FIGS. 7A and 8B. Alternatively, the first sampling terminal may be formed of, for instance, the same low resistivity conductive material as the main body part 121, as shown in FIGS. 7B-7C and FIGS. 8C-8D.

Figure 8C:
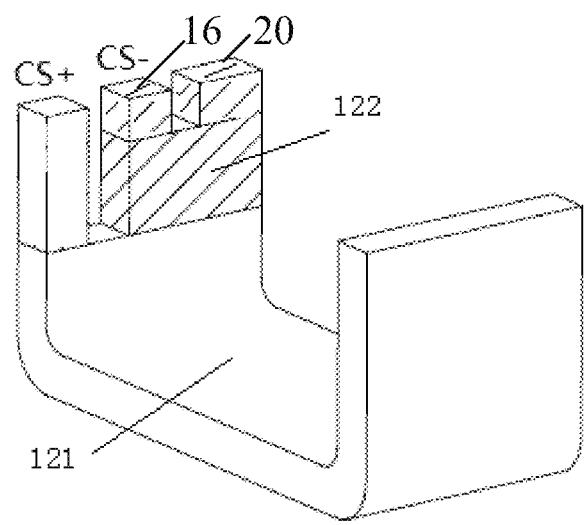
Figure 8D:
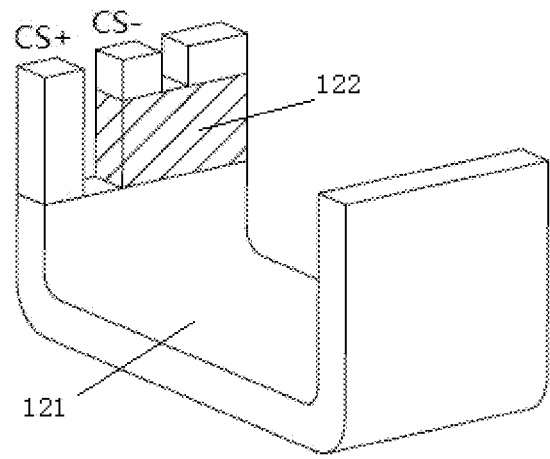

The second sampling terminal 16 (the second inductive terminal 20) may be formed of the same low resistivity conductive material as the main body part 121, but the present disclosure is not limited thereto. For example, the second sampling terminal may be formed of, for instance, the same low temperature coefficient conductive material as the sampling part 122, as shown in FIGS. 8B-8C.

In addition, in order to ensure the high accuracy performance of the sampling current sampled across the two ends of the sampling part, a calibration notch 22 may be used to calibrate the resistance of the sampling part 122, but the present disclosure is not limited thereto.

In actual engineering applications, the second inductive terminal is formed of a low resistivity conductive material, which may reduce the probability that the soldering tin creeps on the sampling part 122 during welding, and thus further improve the accuracy of the current sampling.

The first sampling terminal 14 and the second sampling terminal 16 may be integrated together with the main body part 121 or the sampling part 122, and may be welded by laser.

FIG. 6 is a principle scheme of a current detection circuit having the inductor shown in FIG. 5 according to one embodiment of the present disclosure. According to the present disclosure, the converter using the inductor shown in FIG. 5 to detect current may be an isolated or non-insulated DC-DC converter, such as a buck converter, but the present disclosure is not limited thereto.

As shown in FIG. 6, the inductor according to the embodiment of the present disclosure may function as an output inductor Lo which converts a pulse voltage into a DC voltage. The inductor Lo may be equivalent to an ideal inductor L and a DC resistance connected to the ideal inductor L in series. The DC resistance may be divided into two parts, i.e., a DC resistance DCR1 and a DC resistance DCR2. The DC resistance DCR1 is an equivalent resistance of the low resistivity copper material part in the winding, i.e., mainly the main body part 121 in FIG. 4; and the DC resistance DCR2 is the low temperature coefficient part in the winding, i.e., the sampling part 122 in FIG. 4. The current flowing through the inductor Lo flows through the DC resistance DCR2 as the same time, thereby the current flowing through the inductor may be sampled by sampling the voltage across the two ends of the DC resistance DCR2, and the voltage across the two ends of the DC resistance DCR2 is detected and fed back to the high accuracy amplifier OPA. Since the DC resistance DCR2 has the low temperature drift performance, the current detection signals outputted via the amplifier OPA may be regarded to be high accuracy and low temperature drift, and provide the current signals with high accuracy to the circuit control.

As mentioned above, the windings shown in FIGS. 7A-7C and FIGS. 8A-8D are similar to the winding shown in FIG. 4, which are not repeated herein. It is apparent that the windings shown in FIGS. 7A-7C and FIGS. 8A-8D may be applied to the inductor shown in FIG. 5.

In the solutions shown in FIG. 4, FIGS. 7A-7C and FIGS. 8A-8D, the sampling terminal is located at one side of the winding, i.e., is located at one side of the magnetic core, but the present disclosure is not limited thereto. For example, the sampling terminal may also be located at two sides of the sampling part, i.e., two sides of the magnetic core.

Figure 9:
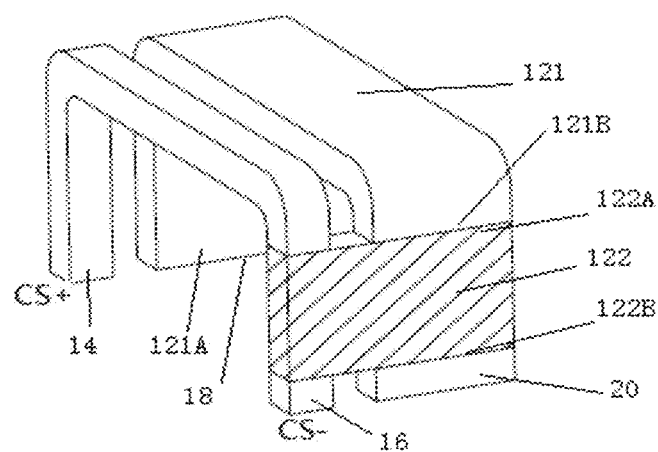
FIG. 9 is a schematic diagram of an inductor winding according to another embodiment of the present disclosure.
Figure 10:
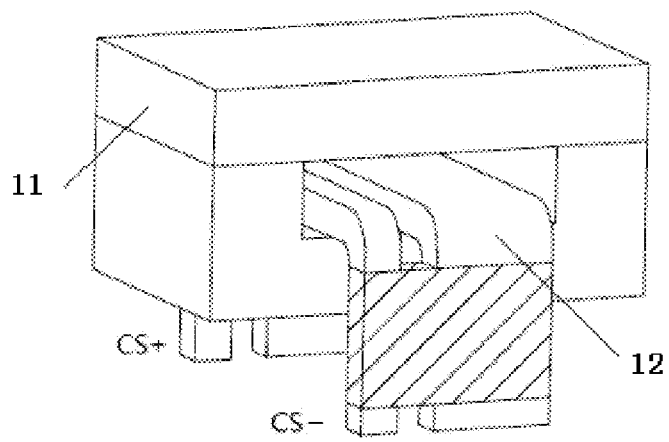
FIG. 10 is a schematic diagram of an inductor according to another embodiment of the present disclosure, and the inductor includes a magnetic core and a winding shown in FIG. 9.

FIG. 9 is a schematic diagram of an inductor winding according to another embodiment of the present disclosure. FIG. 10 is a schematic diagram of an inductor according to another embodiment of the present disclosure, the inductor including a magnetic core and a winding shown in FIG. 9.

As shown in FIG. 9, the winding 12 may include a main body part 121 and a sampling part 122 which are connected in series. The first end 122A of the sampling part 122 is connected to the second end 121B of the main body part 121. The main body part 121 and the first sampling terminal 14 are separately connected to the first end 122A of the sampling part 122. The first end 121A of the main body part 121 functions as the first inductive terminal 18. The second sampling terminal 16 and the second inductive terminal 20 are separately positioned on the second end 122B of the sampling part 122. The first sampling terminal 14 and the main body part 121 may be formed of a low resistivity conductive material. The sampling part 122 may be formed of a low temperature coefficient conductive material. The second sampling terminal 16 and the second inductive terminal 20 may be formed of a low temperature coefficient conductive material or a low resistivity conductive material.

However, the present disclosure is not limited thereto. According to another embodiment, the main body part 121 and the first sampling terminal 14 may be positioned at one end of the sampling part 122. The second sampling terminal and the second inductive terminal sharing one terminal are positioned at the other end of the sampling part. The second sampling terminal and the second inductive terminal may be formed of at least one of the low temperature coefficient conductive material and low resistivity conductive material, and the first sampling terminal may be formed of at least one of the low temperature coefficient conductive material and low resistivity conductive material.

Figure 11:
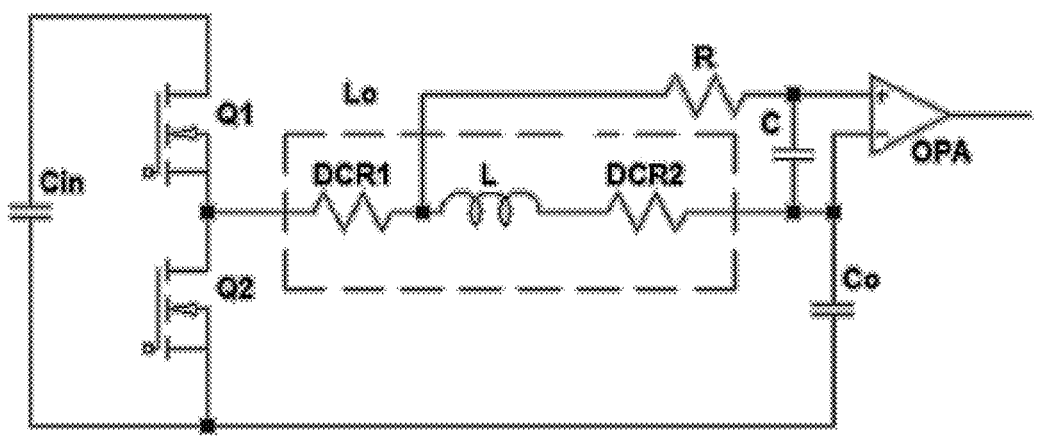
FIG. 11 is a schematic diagram of a current detection circuit having the inductor shown in FIG. 10 according to one embodiment of the present disclosure.

FIG. 11 is a principle scheme of a current detection circuit having the inductor shown in FIG. 10 according to one embodiment of the present disclosure. The current detection circuit shown in FIG. 11 has the similar structure and function with the current detection circuit in FIG. 6, and the same contents are not repeated herein. The difference between them lies in that the current detection circuit further includes a RC filter. Since two sampling terminal CS+ and CS− respectively are output from two sides of the window of the magnetic core, the detected voltage across the two ends of the pin includes a voltage across the two ends of the DC resistance DCR2 and a pulse volt-second balance voltage on the winding of the inductor. Adding a RC filter is used to filter the pulse volt-second balance voltage on the winding of the inductor, thereby a voltage across the two ends of the DC resistance DCR2 may be obtained. The voltage across the two ends of the DC resistance DCR2 is fed back to the high accuracy amplifier OPA. Since the DC resistance DCR2 is a resistor with high accuracy and low temperature drift, the output from the amplifier OPA may be used as the current detection signal having high accuracy and low temperature drift.

Figure 12:
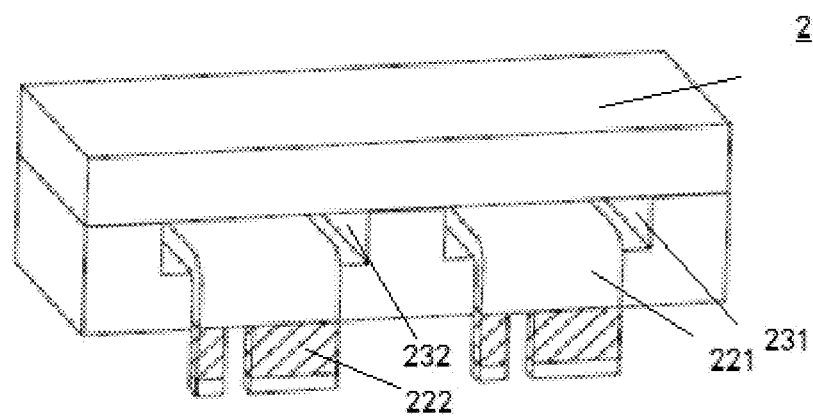
FIG. 12 is a schematic diagram of a multiphase inductor according to one embodiment of the present disclosure.

FIG. 12 is a schematic diagram of a multiphase inductor according to one embodiment of the present disclosure. The inductor according to the embodiments of the present disclosure may be a multiphase inductor. As shown in FIG. 12, a two-phase inductor 2 includes a magnetic core 21 having two windows 231 and 232. Two windings 221 and 222 respectively run through the two windows 231 and 232 of the magnetic core 21 so as to form the two-phase inductor. The structure and function of the windings 221 and 222 may be the same as those of the inductor shown in any one of FIG. 4, FIGS. 7A-7C and FIGS. 8A-8D.

Figure 13:
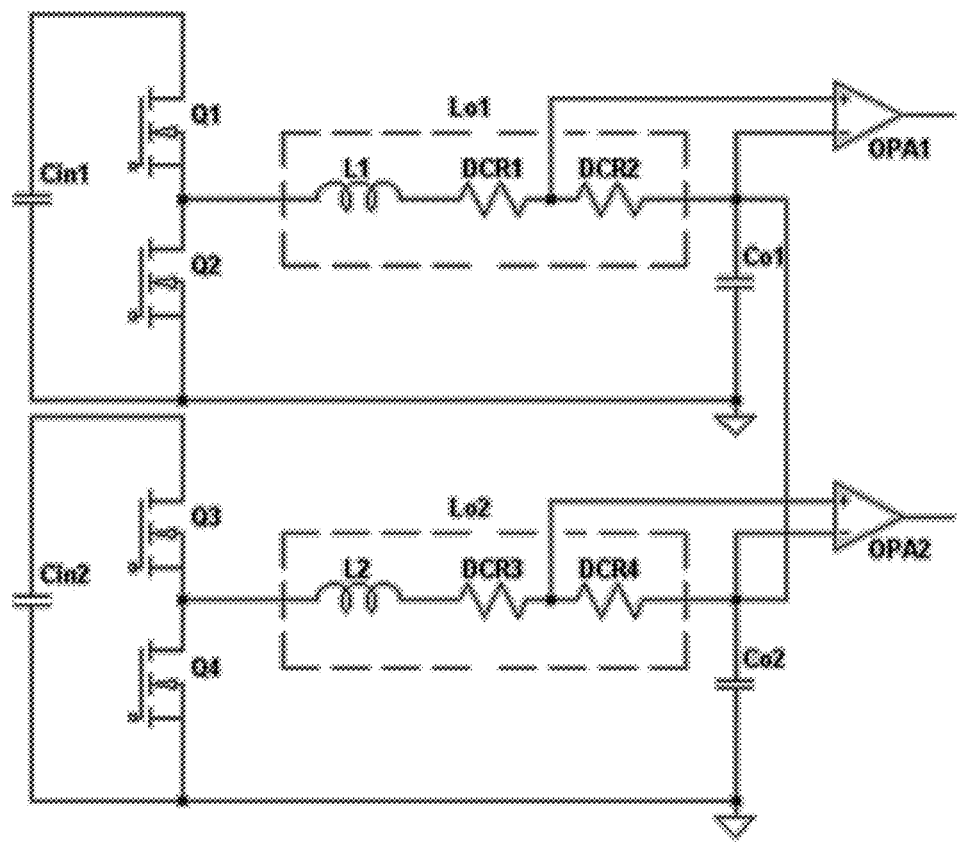
FIG. 13 is a schematic circuit diagram of having the inductor shown in FIG. 12 to the multiphase converter.

FIG. 13 is a schematic circuit diagram of having the inductor shown in FIG. 12 to the multiphase converter. The outputs of a plurality of converters may be connected in parallel, or connected interleavely, or each converter provides a separate output. For each winding, the voltage across the two ends of the low temperature coefficient part is detected and fed back to the high accuracy amplifier OPA. Thereby, the current detection signal having high accuracy and low temperature drift may be obtained for each phase. The structure of the current detection circuit in the converter of each phase is similar to that shown in FIG. 6, which is not repeated herein.

Figure 14:
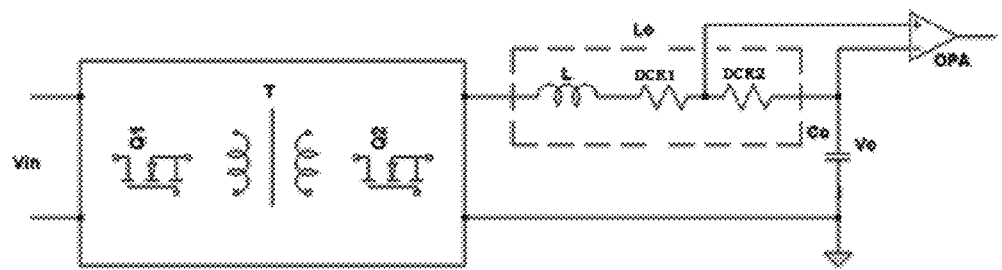
FIG. 14 is a schematic circuit diagram of an isolated DC-DC converter according to one embodiment of the present disclosure.
Figure 15:
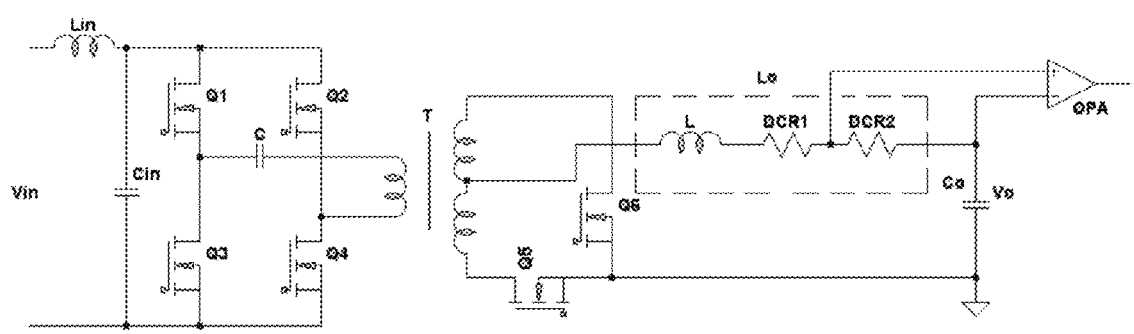
FIG. 15 is a schematic circuit diagram of an isolated full bridge DC-DC converter according to one embodiment of the present disclosure.

The inductor Lo in the embodiments of the present disclosure may be applied to the isolated DC-DC converter shown in FIG. 14. The isolated DC-DC converter shown in FIG. 14 may be an isolated full-bridge DC-DC converter shown in FIG. 15. The secondary side of the isolated full-bridge DC-DC converter adopts a synchronous rectification. The circuit is known for the person skilled in the art, and thus is not repeated herein.

Figure 16:
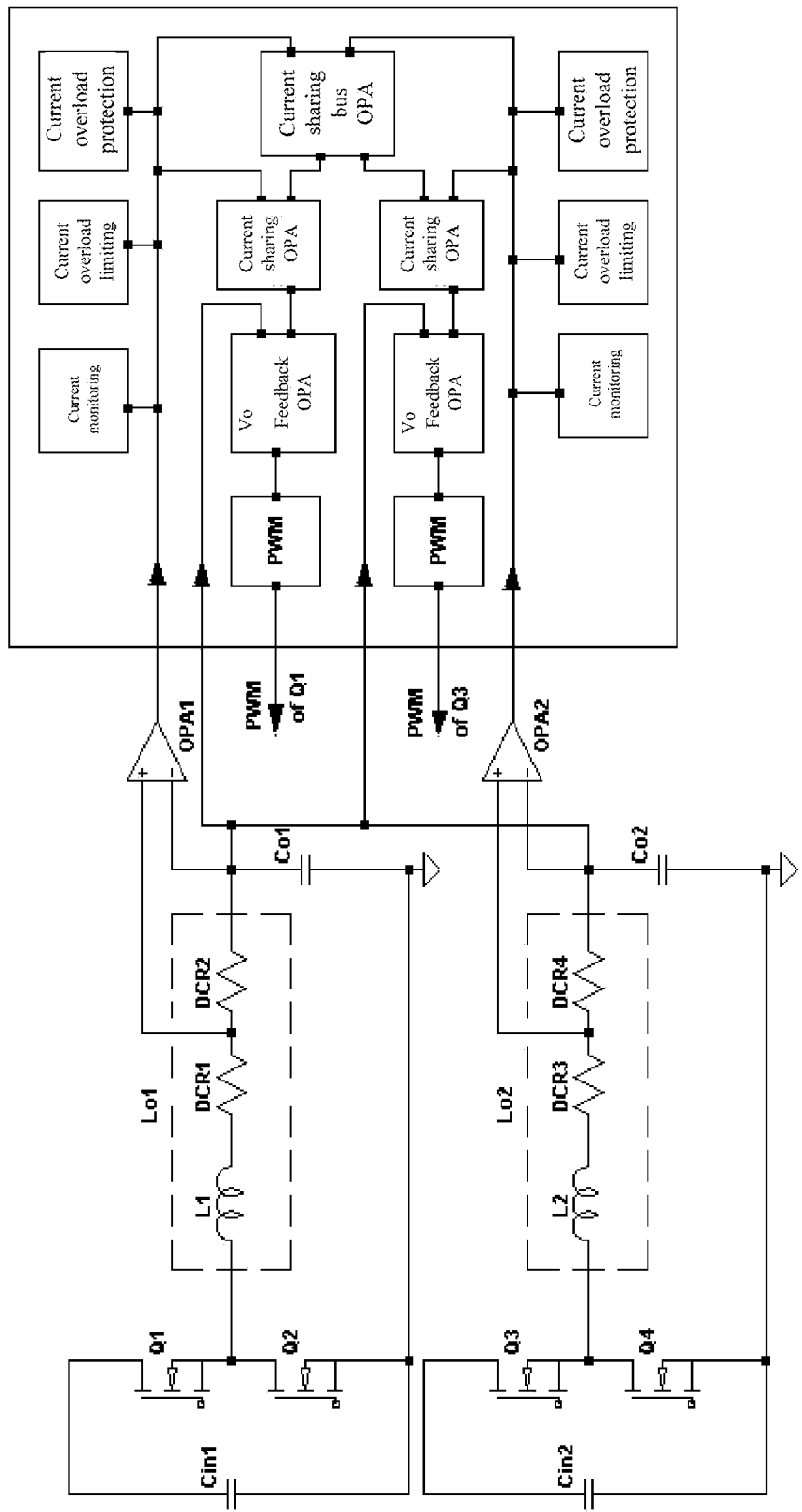
FIG. 16 is a schematic block diagram of a converter having the inductor of the present disclosure according to one embodiment of the present disclosure.

FIG. 16 is a schematic circuit diagram of an application of the converter according to one embodiment of the present disclosure, and the circuit diagram thereof is shown in FIG. 13. As shown in FIG. 16, the current signal detected by the inductor according to the embodiments of the present disclosure may be applied to various control functions, such as current monitoring, current overload limiting, current overload protection and current sharing control.

The current monitoring circuit receives a current detection signal and sends the current detection signal to the system via analog pins or digital pins.

The current overload limiting circuit receives a current detection signal, and if the current exceeds a threshold value, the current overload limiting circuit limits a duty cycle and limits an output current by limiting Vo.

The current overload protection circuit receives a current detection signal, and if the current exceeds a threshold value, the current overload protection circuit adjusts the duty cycle to be 0 so as to close the output voltage Vo.

For example, the current sharing control circuit includes a current sharing bus OPA (operation amplifier) and two current sharing OPAs. The current sharing bus OPA receives current of two phases so as to form a current sharing bus. Then, the current detection signals and the current sharing bus signals of each phase are transmitted to the corresponding current sharing OPA. The output voltage signals of the corresponding current sharing OPA are transmitted to the corresponding output voltage (Vo) feedback OPA for adjusting the duty cycle to balance the current of two phases.

Figure 17A:
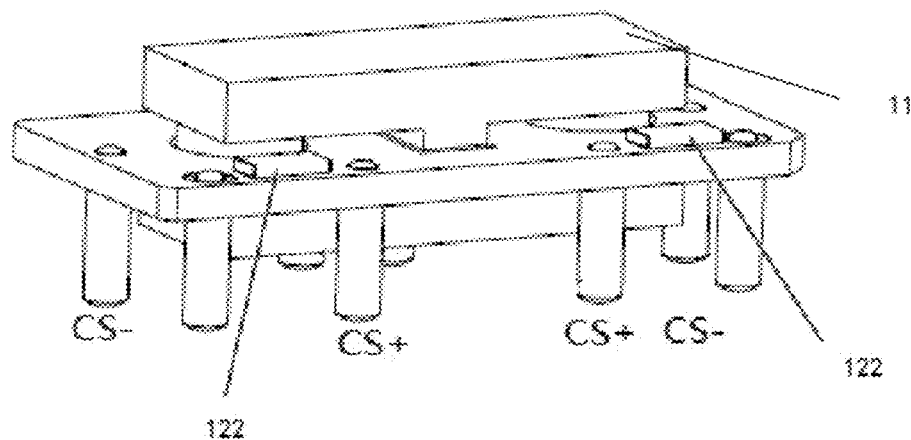
FIGS. 17A and 17B are schematic diagrams of an inductor according to another embodiment of the present disclosure.
Figure 17B:
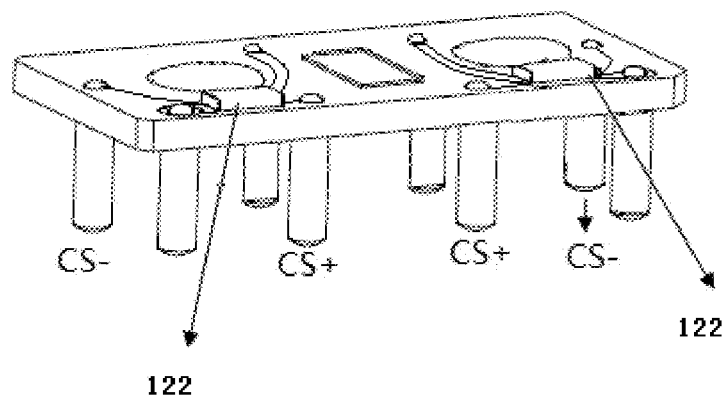

FIG. 17A illustrates a schematic diagram of an inductor according to another embodiment of the present disclosure. FIG. 17B is a schematic diagram of the inductor in FIG. 17A after removing the magnetic core 11. The inductor is a two-phase inductor, and hereinafter, one phase thereof is described. As shown in FIGS. 17A and 17B, the winding of the inductor includes a winding printed in a printed circuit board (PCB). For example, the inductor includes a PCB winding board, the main body part 121 is printed within the PCB winding board, and the current sampling part 122, i.e., the low temperature coefficient part with high accuracy is provided on the PCB winding board. The current sampling part 122 may, for example, be connected to the main body part via welding, so as to function as one part of the winding of the inductor. In addition, the inductor is further added with a first sampling terminal CS+ and a second sampling terminal CS− as pins of the current detection for detecting a voltage across the two ends of the current sampling part with high accuracy. Thereby, the current detection signal with high accuracy and low temperature drift may be obtained. Additionally, pins may raise the inductance to form a float inductor.

Figure 18A:
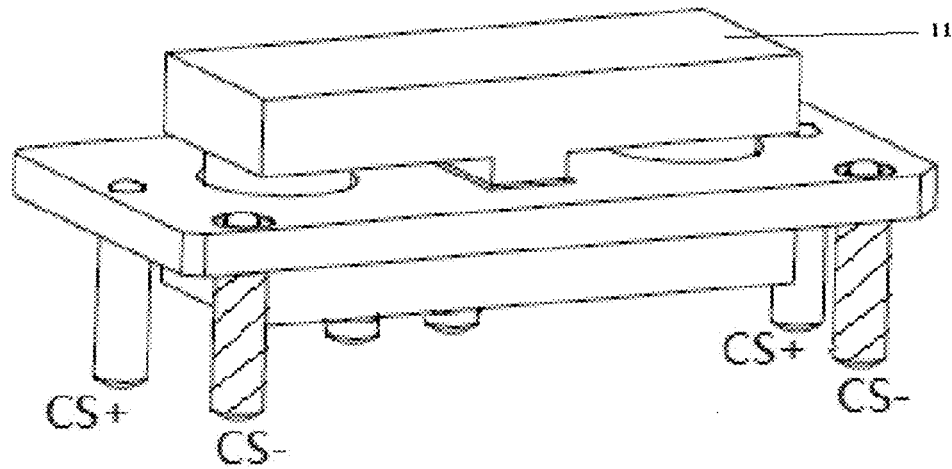
FIGS. 18A and 18B are schematic diagrams of an inductor according to another embodiment of the present disclosure.
Figure 18B:
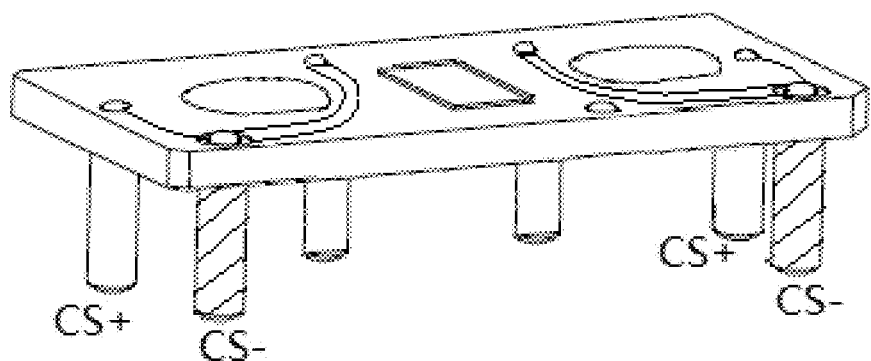

FIG. 18A illustrates a schematic diagram of an inductor according to another embodiment of the present disclosure. FIG. 18B is a schematic diagram of the inductor in FIG. 18A after removing the magnetic core 11. As shown in FIGS. 18A and 18B, the inductor adopts a PCB winding. One pin CS− of the PCB winding is replaced by a pin of low temperature coefficient conductive material, the pin of low temperature coefficient conductive material is used as the sampling part of the inductor, and a first sampling terminal CS+ is added for detecting the voltage across the two ends of the pin of low temperature coefficient conductive material. Thereby, the current detection signal with high accuracy and low temperature drift may be obtained.

In one embodiment, the magnetic core 11 is a ferrite magnetic core, but the present disclosure is not limited thereto. For example, the magnetic core 11 may also be formed of magnetic material having distributed gaps.

Here, a single-turn winding is explained as the embodiment of the present disclosure, but in actual applications, the winding 12 may be a single-turn or a multiple-turn winding. FIG. 4 illustrates a single-turn winding as an example. The winding may be a coil winding or a PCB winding.

The inductor having a current sampling function provided by the present disclosure integrates the current sampling part into the winding of the inductor, thereby space may be saved, miniaturization of the converter is promoted, cost may be reduced and the current sampling loss may be reduced. The sampling part is formed of a low temperature coefficient conductive material, thereby reducing the influence of temperature on the current sampling signals, increasing the current sampling accuracy, and providing a basis for precisely controlling the converter.

Although the present disclosure has been described in terms of the embodiments, it should be understood that such disclosure is not for purpose of restriction. On the contrary, various changes and modifications are apparent to those skilled in the art based on the above disclosure. Accordingly, the present disclosure intends to cover all changes, modifications, and equivalent arrangements within the spirit and scope of the appending claims.

What is claimed is:

1. An inductor having a current sampling function, comprising:
    a magnetic core comprising at least one window; and
    at least one winding provided within the at least one window, wherein the at least one winding comprises a main body part and a sampling part, the main body part has a first end and a second end, the sampling part has a first end and a second end, the first end of the sampling part is connected to the second end of the main body part such that the main body part and the sampling part are connected in series, and a length ratio of the sampling part to the main body part is less than 2,
    wherein the main body part is formed of a low resistivity conductive material, the sampling part is formed of a low temperature coefficient conductive material, and a current flowing through the inductor is sampled across two ends of the sampling part,
    wherein the inductor further comprises a first sampling terminal and a second sampling terminal, the first sampling terminal is connected to the second end of the main body part or the first end of the sampling part, the second sampling terminal is connected to the second end of the sampling part, and the current flowing through the inductor is sampled by the first sampling terminal and second sampling terminal, and
    wherein the inductor further comprises a first inductive terminal provided at the first end of the main body part, wherein the second sampling terminal also functions as a second inductive terminal, and the second sampling terminal and the second inductive terminal are the same terminal, have the same size and are commonly used.

2. The inductor as recited in claim 1, wherein the first sampling terminal and second sampling terminal are positioned at one side of the magnetic core.

3. The inductor as recited in claim 1, wherein a temperature coefficient of the low temperature coefficient conductive material is less than 500 ppm.

4. The inductor as recited in claim 3, wherein the temperature coefficient of the low temperature coefficient conductive material is less than or equal to 300 ppm.

5. The inductor as recited in claim 1, wherein a resistivity of the low resistivity conductive material is lower than 0.1Ω·mm2/m.

6. The inductor as recited in claim 1, wherein the main body part and the sampling part are welded together via laser welding.

7. The inductor as recited in claim 1, wherein the sampling part comprises a calibration notch.

8. The inductor as recited in claim 1, wherein the magnetic core is a ferrite magnetic core or a magnetic core having distributed gaps.

9. The inductor as recited in claim 1, wherein the length ratio of the sampling part to the main body part is less than 1.

* * * * *